United States Patent
Hoshino et al.

(10) Patent No.: US 11,325,822 B2
(45) Date of Patent: May 10, 2022

(54) WATER DISPENSER AND PURE WATER PRODUCING APPARATUS

(71) Applicant: ORGANO CORPORATION, Tokyo (JP)

(72) Inventors: Takafumi Hoshino, Tokyo (JP); Hiroshi Matsumura, Nagano (JP)

(73) Assignee: ORGANO CORPORATION, Tokyo (JP)

(*) Notice: Subject to any disclaimer, the term of this patent is extended or adjusted under 35 U.S.C. 154(b) by 0 days.

(21) Appl. No.: 17/295,233

(22) PCT Filed: Oct. 31, 2019

(86) PCT No.: PCT/JP2019/042831
§ 371 (c)(1),
(2) Date: May 19, 2021

(87) PCT Pub. No.: WO2020/105394
PCT Pub. Date: May 28, 2020

(65) Prior Publication Data
US 2022/0017352 A1  Jan. 20, 2022

(30) Foreign Application Priority Data

Nov. 21, 2018 (JP) .............................. JP2018-218191
Nov. 21, 2018 (JP) .............................. JP2018-218192
Nov. 21, 2018 (JP) .............................. JP2018-218256

(51) Int. Cl.
*B67D 1/14* (2006.01)
*B67D 1/00* (2006.01)
(Continued)

(52) U.S. Cl.
CPC ......... *B67D 1/1477* (2013.01); *B67D 1/0014* (2013.01); *B67D 1/0888* (2013.01); *C02F 9/005* (2013.01); *C02F 1/325* (2013.01); *C02F 1/42* (2013.01); *C02F 1/444* (2013.01); *C02F 2001/422* (2013.01); *C02F 2001/425* (2013.01); *C02F 2303/04* (2013.01); *C02F 2307/10* (2013.01)

(58) Field of Classification Search
CPC .. B67D 1/1477; B67D 1/0014; B67D 1/0888; C02F 9/005; C02F 1/325; C02F 1/42; C02F 1/444; C02F 2001/422; C02F 2001/425; C02F 2303/04; C02F 2307/10; B05B 11/0091; B65D 25/46; B65D 47/065
See application file for complete search history.

(56) References Cited

U.S. PATENT DOCUMENTS 1,042,845 A * 10/1912 Toth ...................... B01D 35/04
                                                        285/283
4,035,004 A *  7/1977 Hengesbach ......... B05B 7/2408
                                                        222/536
(Continued)

FOREIGN PATENT DOCUMENTS

JP         9-253623 A      9/1997
JP         1345532        12/2008
(Continued)

OTHER PUBLICATIONS

International Search Report issued in International Patent Application No. PCT/JP2019/042831, dated Feb. 4, 2020, along with English translation thereof.
(Continued)

*Primary Examiner* — Donnell A Long
(74) *Attorney, Agent, or Firm* — Greenblum & Bernstein, P.L.C.

(57) ABSTRACT

A water dispenser which is connected to a pure water source and used for dispensing pure water includes: an arm mounting unit; a water dispensing gun including a nozzle for discharging pure water; a holding unit for holding the water dispensing gun; and at least two arms connecting the holding unit to the arm mounting unit. The at least two arms constitute a parallel link mechanism in which a trajectory of each arm when the at least two arms move is within the same vertical plane.

19 Claims, 5 Drawing Sheets

(51) Int. Cl.
    *B67D 1/08*      (2006.01)
    *C02F 9/00*      (2006.01)
    *C02F 1/32*      (2006.01)
    *C02F 1/42*      (2006.01)
    *C02F 1/44*      (2006.01)

(56) References Cited

U.S. PATENT DOCUMENTS

| | | |
|---|---|---|
| D565,692 S | 4/2008 | Berducat et al. |
| 7,729,832 B2 * | 6/2010 | Benckert ................ E04G 21/04 |
| | | 222/533 |

FOREIGN PATENT DOCUMENTS

| | | |
|---|---|---|
| JP | 2012-210573 A | 11/2012 |
| JP | 2014-023989 A | 2/2014 |
| JP | 1600941 S | 4/2018 |
| JP | 2018-103154 A | 7/2018 |
| KR | 10-2006-0066495 | 6/2006 |

OTHER PUBLICATIONS

Written Opinion of the International Searching Authority Report issued in International Patent Application No. PCT/JP2019/042831, dated Feb. 4, 2020, along with English translation thereof.
Office Action issued in the corresponding Indian Patent Application No. 202137019439 dated Feb. 22, 2022, along with English translation thereof.

* cited by examiner

WATER DISPENSER AND PURE WATER PRODUCING APPARATUS

TECHNICAL FIELD

The present invention relates to a water dispenser which is connected to a pure water producing apparatus or the like and discharges pure water according to demand, and a pure water producing apparatus equipped with such a water dispenser.

BACKGROUND ART

When pure water is used in a research institute or the like, pure water is often produced using a relatively small pure water producing apparatus. A water dispenser connected to the pure water producing apparatus is widely used for dispensing or delivering pure water into, for example, beakers, flasks, test tubes, etc., at a point of use. The water dispenser includes: a nozzle for discharging pure water; and a valve provided in a path of pure water to the nozzle for supplying pure water to the nozzle and for shutting off the supply. The water dispenser is usually provided at a place apart from a main unit of the pure water producing apparatus and is connected to a pure water outlet at the main unit of the pure water producing apparatus by a pipe. Pure water is discharged from the nozzle by a user operating the valve, so that the user can dispense pure water in an amount corresponding to his or her need. A manually-operated valve can be used as the valve, it is also possible to use a solenoid valve. The manually-operated valves are not limited to those operated by hand, but include those operated, for example, by a foot pedal or the like. When a solenoid valve is used, the solenoid valve is controlled by a push button switch that can be manipulated by a finger or a foot switch that can be manipulated by a foot, to discharge pure water from the nozzle. Furthermore, by combining a flow sensor and the solenoid valve and by opening the solenoid valve until the flow amount measured by the flow sensor when there is a single switch operation reaches a specified value, it is also possible to dispense a specified amount of pure water.

Patent Literature 1 discloses a water dispenser including: a support portion capable of changing a mounting location thereof with respect to a strut in a plurality of stages; and a grip rod-shaped nozzle portion which is equipped with a nozzle for discharging pure water downward at the lower end of the nozzle portion and is supported at the tip of the support portion, wherein a push button switch which can make the solenoid valve open when the push button switch is pushed downward is provided at the upper end of the nozzle portion. Patent Literature 2 discloses a water dispenser including: a main unit equipped with an operation panel and the like; and a water dispensing gun portion provided with a nozzle.

In fields such as bioscience, it is necessary to reduce the number of viable bacteria in pure water because the experimental and analytical results are affected when the number of viable bacteria in pure water is large. Therefore, it is necessary to reduce the number of viable bacteria contained in pure water discharged from the pure water dispenser. Patent Literature 3 discloses a water dispenser including: a solenoid valve connected to a pure water source; a nozzle for discharging pure water; a flow channel for connecting the nozzle to the outlet of the solenoid valve; and an ultraviolet LED disposed so as to irradiate the pure water flowing through the flow channel with ultraviolet rays, thereby making possible to reduce the viable bacteria contained in the pure water discharged from the nozzle by irradiating the pure water immediately before being discharged from the nozzle with ultraviolet rays.

CITATION LIST

Patent Literature

Patent Literature 1: JP 1345532 S
Patent Literature 2: JP 1600941 S
Patent Literature 3: JP 2018-103154 A

SUMMARY OF THE INVENTION

Technical Problem

Using a water dispenser used in Patent Literature 1 or Patent Literature 2 facilitates an operation of dispensing pure water into beakers, flasks, test tubes, or the like, in a laboratory or the like. However, in terms of usability, there is room for further improvement in these water dispensers. For example, it is required to be able to easily and safely perform stable water dispensing for various containers having different sizes and heights, such as beakers or flasks, and further, tanks made of synthetic resin.

It is an object of the present invention to provide a water dispenser capable of easily performing stable water dispensing or delivering into various containers having different sizes and heights, and a pure water producing apparatus equipped with such a water dispenser.

Solution to Problem

The water dispenser according to the present invention is a water dispenser for use in dispensing pure water, connected to a pure water source, the water dispenser comprising: an arm mounting unit; a water dispensing gun including a nozzle for discharging pure water; a holding unit for holding the water dispensing gun; and at least two arms connecting the holding unit to the arm mounting unit, wherein the at least two arms constitute a parallel link mechanism in which a trajectory of each arm when the at least two arms move is within the same vertical plane.

The pure water producing apparatus according to the present invention is a pure water producing apparatus comprising the water dispenser according to the present invention, wherein the pure water producing apparatus supplies pure water to the water dispenser as the pure water source.

By adopting a parallel link mechanism, it is possible to change the height of the water dispensing gun without changing the posture of the water dispensing gun held on the holding unit, so that it is possible to cope with various containers having different sizes and heights. Thus, according to the present invention, it is possible to easily perform stable water dispensation for various containers having different sizes and heights.

DESCRIPTION OF EMBODIMENTS

Next, a preferred embodiment of the present invention will be described with reference to the accompanying drawings. Before specifically describing the water dispenser according to the present invention, first, a pure water producing apparatus as a pure water source with respect to a water dispenser will be described with reference to FIG. 1. Although water dispenser 30 is removably connected to the pure water producing apparatus 10, pure water producing apparatus 10 is illustrated in FIG. 1 as water dispenser 30 has been already connected thereto.

Figure 1:
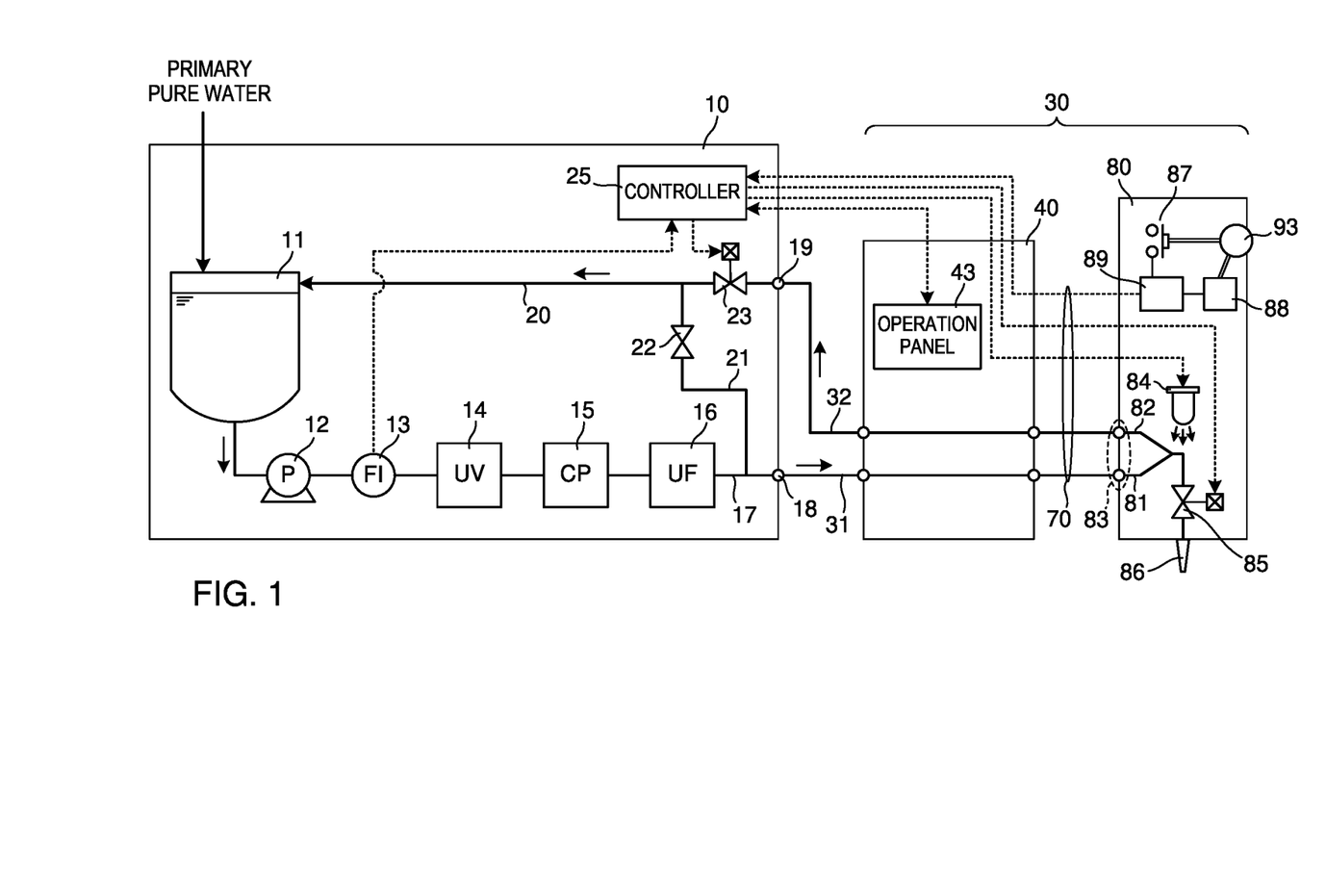
FIG. 1 is a diagram illustrating an example of a configuration of a pure water producing apparatus.

Pure water producing apparatus 10 shown in FIG. 1 is configured as a subsystem (i.e., secondary pure water system) which generates pure water by circulation purification. Pure water producing apparatus 10 is equipped with: storage tank 11 to which primary pure water is supplied; pump 12 which is connected to the outlet of storage tank 11 and feeds the pure water stored in storage tank 11; flow sensor (FI) 13 connected to the outlet of pump 12; ultraviolet oxidation device (UV) 14, non-regenerative ion exchanger (CP: also referred to as cartridge polisher) 15 filled with a strong acidic cation exchange resin and a strong basic anion exchange resin in a mixed bed manner; and ultrafiltration device (UF) 16. Ultraviolet oxidization device 14, non-regenerative ion exchange device 15 and ultrafiltration device 16 are connected in series to the outlet of flow sensor 13 in this order. Although ultraviolet oxidation device 14 is for decomposing total organic carbon (TOC) in pure water and also has a sterilizing function, an ultraviolet sterilizing lamp may be provided in storage tank 11 separately from ultraviolet oxidization device 14.

Pure water producing apparatus 10 generates pure water by circulation purification, and, in this embodiment, pure water is circulated via water dispenser 30. Therefore, the outlet of ultrafiltration device 16 is connected to circulation outlet 18 of pure water producing apparatus 10 via pipe 17. Further, pure water producing apparatus 10 is provided with circulation inlet 19 for receiving pure water returned from water dispenser 30, and circulation inlet 19 is connected to storage tank 11 via pipe 20. As the primary pure water, for example, water obtained by passing municipal water through a filter, an activated carbon treatment apparatus, and an ion exchange apparatus is used.

In this pure water producing apparatus 10, a circulation purification system is configures which passes through flow sensor 13, ultraviolet oxidation device 14, non-regenerative ion exchange device 15, ultrafiltration device 16 and water dispenser 30 from storage tank 11, and returns to storage tank 11. By operating pump 11 to circulate pure water in the circulation purification system, pure water is further purified. As it is possible to circulate pure water even when water dispenser 30 is not connected, pipe 17 and pipe 20 is provided, and pipe 21 is provided with bypass valve 22. Bypass valve 22 is closed when water dispenser 30 is connected to pure water producing apparatus 10, and is opened when not connected. To perform volumetric water dispensation to be described later, in pipe 20, solenoid valve 23 is provided at a position on the side of circulation inlet 19 with respect to the position where pipe 21 is connected to pipe 20. Further, pure water producing apparatus 10 is provided with controller 25 for controlling the overall operation of pure water producing apparatus 10.

Water dispenser 30 is constituted by: main unit 40 which is placed on an installation surface such as a laboratory bench, for example; and water dispensing gun 80 which can be held and moved by a user's hand. Water dispensing gun 80 is also referred to as a water dispensing head or the like. Nozzle 86 for actually discharging pure water is provided in water dispensing gun 80. Water dispenser 30 includes pipes 31, 32 respectively connected to circulation outlet 18 and circulation inlet 19 of pure water producing apparatus 10, and pipes 31, 32 extend through main unit 40 to water dispensing gun 80. In main unit 40, operation panel 43 made of a touch panel, for example, is provided for presenting information to the user and receiving an input from the user.

Between main unit 40 and water dispensing gun 80, pipes 31 and 32 are is provided as composite pipe 70 in which these pipes 31, 32 are integrated. Electrical wiring between main unit 40 and water dispensing gun 80 is also incorporated in composite pipe 70. Water dispensing gun 80 is connected to composite pipe 70 by its connecting portion 83. Pipes 81, 82 with one ends thereof respectively connected to pipes 31, 32 via connecting portion 83 are provided inside water dispensing gun 80. The other ends of pipe 81, 82 are connected to each other, and a flow channel extending from this connection point to nozzle 86 is formed. Although the configuration of this flow channel will be described later, solenoid valve 85 is provided in this flow channel, and ultraviolet LED 84 is disposed so as to irradiate pure water in the flow channel with ultraviolet rays for sterilizing viable bacteria contained in pure water. Solenoid valve 85 is a proportional control valve, for example, which can adjust its opening degree when the valve opens. Further, water dispensing gun 80 is provided with wheel 93 which is used for performing operation of opening and closing solenoid valve 85, and adjusting the flow rate of pure water when opening solenoid valve 85. Wheel 93 is rotatable about an axle extending in the horizontal direction, and is configured so that the user can rotate wheel 93 and also push wheel 93 by his or her finger. Rotation of wheel 93 is detected by rotary encoder 88 coupled to its rotary axle, and whether wheel 93 is pushed or not is detected by microswitch 87 which is mounted on support member 100 (refer to FIG. 6A and FIG. 6B) for holding wheel 93. Processing circuit 89 for processing the detection result of the microswitch 87 and the detection result of the rotary encoder 88 is also provided within water dispensing gun 80.

Figure 2A:
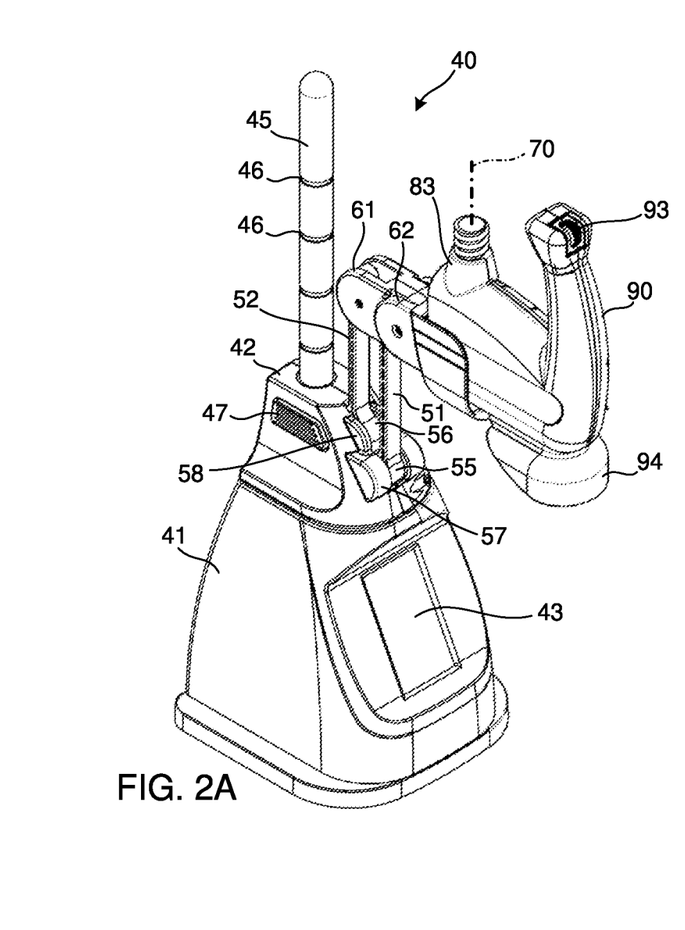
FIG. 2A and FIG. 2B are perspective views of a water dispenser according to one embodiment of the present invention viewed from the front side and the rear side, respectively.
Figure 2B:
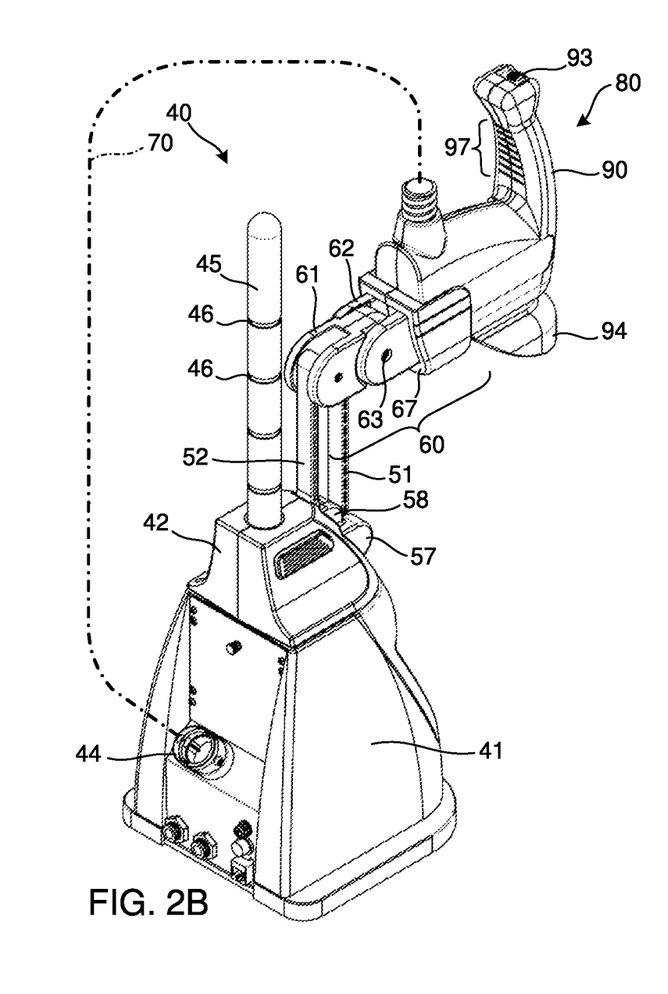
Figures 3A, 3B, 3C:
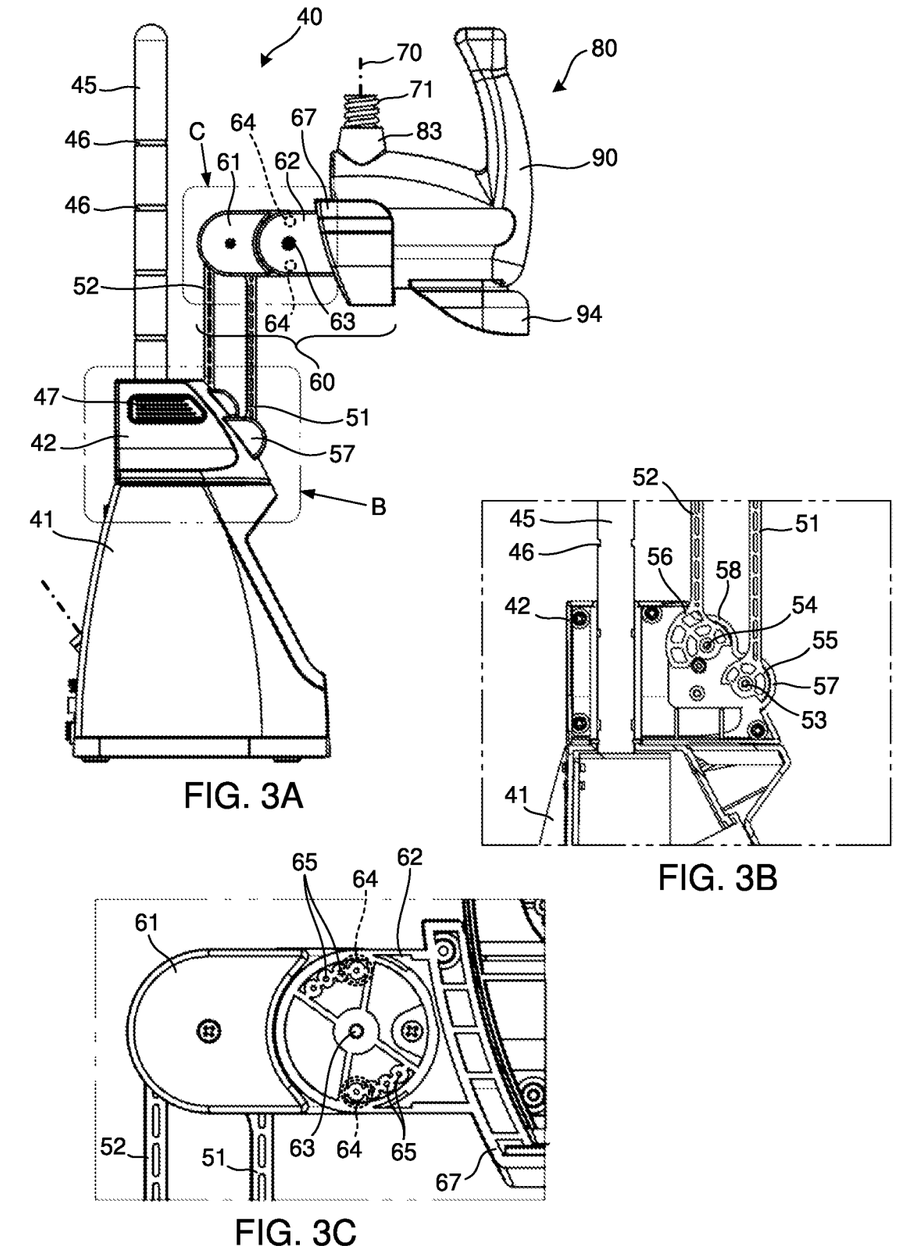
FIG. 3A is a schematic side view of the water dispenser.
FIG. 3B and FIG. 3C are cross-sectional views of the parts in Box B and in Box C in FIG. 3A, respectively.

FIG. 2A and FIG. 2B are views showing the appearance of water dispenser 30, and perspective views viewed from the front side and the rear side, respectively. FIG. 3A is a left side view illustrating the main part of the configuration of the water dispenser, FIG. 3B is a cross-sectional view in a portion surrounded by double-dotted chain line B in FIG. 3A, and FIG. 3C is a cross-sectional view of a portion surrounded by double-dotted chain line C in FIG. 3A. Although the right side view of water dispenser 30 is omitted here, except that release button 47 to be described later is not provided, the right side view of the water dispenser is generally symmetrical shape to the left side view. Water dispenser 30 will be described in further detail with these drawings. Incidentally, water dispensing gun 80 of water dispenser 30 as described later is provided with protective cover 94 so as to surround nozzle 86. Since nozzle 86 is hidden by cover 94, nozzle 86 itself is not shown in FIGS. 2A, 2B, 3A, 3B and 3C.

Main unit 40 is composed of: base 41 which is a portion to be placed on a laboratory bench and the like; arm mounting unit 42 located above base 41; columnar portion 45 extending upward from base 41; two arms 51, 52 with one ends attached to arm mounting unit 42; and holding unit 60 for actually holding water dispensing gun 80 in a detachable manner Columnar portion 45 is configured as a cylindrical strut penetrating arm mounting unit 42. Grooves 46 extending in the circumferential direction are formed on the surface of columnar portion 45 at regular intervals along the longitudinal direction of columnar portion 45. Arm mounting unit 42 is configured to be slidable along columnar portion 45 in the longitudinal direction of columnar portion 45. Actually, a projection (not shown) biased by a spring or the like against the surface of columnar portion 45 is provided inside arm mounting unit 42. The projection is configured to be engaged with grooves 46 provided on the surface of columnar portion 45. Thus, it is possible to fix the height position of arm mounting unit 42 at a position where the projection is engaged with groove 46. Further, since each of grooves 47 is provided so as to make one round of the surface of columnar portion 45 along the circumferential direction, it is possible to fix the height direction to rotate arm mounting unit 42 around columnar portion 45. It is possible to release the engagement state of the projection to groove 47 by pushing release button 47 provided on the side surface of arm mounting unit 42. The user can easily move arm mounting unit 42 in the longitudinal direction of columnar portion 45 while pressing release button 47. It is possible to easily adjust the height position of arm mounting unit 42 within the length of columnar portion 45

Holding unit 60 for actually holding water dispensing gun 80 in a detachable manner is attached to arm mounting unit 42 so that a parallel link mechanism is constituted by two arms 51, 52. In the present embodiment, two arms 51, 52 are configured to be able to move in a range of 90° from horizontal to vertical with keeping a state in which both are parallel to each other and with using their ends on the side of arm mounting unit 42 as fixed ends. As arms 51, 52 move, the trajectories of arms 51, 52 are in the same vertical plane. Arms 51, 52 are movable in this vertical plane as the parallel link mechanism. The parallel link mechanism consisting of two arms 51, 52 functions as a connecting mechanism for connecting holding unit 60 to arm mounting unit 42, which is a mounting base, so that the relative position of holding unit 60 with respect to arm mounting unit 42 can be changed without changing the posture of water dispensing gun 80 with respect to arm mounting unit 42. Here, the parallel link mechanism is constituted by arms 51, 52, but the number of arms for constituting the parallel link mechanism is not limited to 2, and may be 3 or more. In the following, it is assumed that the parallel link mechanism is constituted by two arms 51, 52.

When water is dispensed or delivered in a container such as a flask or a beaker, there is a desire to make water dispensing gun 80 not need to be held by hand. In particular, such a desire is stronger when the amount of water to be dispensed is large and it takes a long time to dispense water. In this case, since the size of the container varies, it is desired that the height position of water dispensing gun 80 be easily changed. In addition, in the actual water dispensing operation, it is considered that, after the user has placed the container at a predetermined position, the user brings water dispensing gun 80 close to the opening of the container to discharge the pure water from nozzle 86, and when the water dispensing is completed, the user move away water dispensing gun 80 from the opening of the container. By employing a parallel link mechanism that is movable in a vertical plane, such a series of operations can be performed smoothly without changing the posture of water dispensing gun 80, particularly the orientation of nozzle 86. Further, in addition to the adoption of a parallel link mechanism, by enabling change of the height position of arm attachment unit 42 as described above, it is possible to cope with water dispensing, from a small beaker or flask to a large beaker, and even a polyethylene tank. For a smooth water dispensation operation on a container, a length of some or more is required for arms 51, 52, and these arms 51, 52 may interfere with the operation when water dispenser 30 is not in use. In this embodiment, so that arms 51, 52 can be in a vertical state, arms 51, 52 are also prevented from interfering with the operation when the water dispensation is not performed.

In the present embodiment, the position where arms 51, 52 are actually attached in arm mounting unit 42 is inside arm mounting unit 42. As shown in FIG. 3B, the tip ends of arms 51, 52 are rotatably mounted around respective axles 53, 54 in arm mounting unit 42. In this case, it is necessary to provide a groove-shaped opening in the surface of the mounting unit 42 in accordance with the movable range of arms 51, 52. Considering the clearance, the width of the groove-shaped opening is assumed to be slightly wider than the thickness of arms 51, 52 measured in the extending direction of axles 53, 54. If the distance between arm mounting unit 42 and operation panel 43 is close, there is a possibility that the user's finger attempting to touch operation panel 43 is caught in the groove-shaped opening by mistake. Therefore, in the present embodiment, together with shifting the position of axles 53, 54 with respect to the extending direction of arms 51, 52, the end portions of arms 51, 52 around axles 53, 54 are expanded to form bulging portions 55, 56. Bulging portion 55 of arm 51 is, for example, in a shape of a semicircle cut out from a circle around axle 53, and bulging portion 56 of arm 52 is, for example, in a shape obtained by combining the cut out quadrant from each of the two circles having different radii around axle 54. The thickness of bulging portions 55, 56 in the extending direction of axles 53, 54 is the same as the thickness of arms 51, 52 described above. By thus providing bulging portions 55, 56, the groove-shaped opening formed in arm mounting unit 42 is substantially closed by bulging portions 55, 56 regardless of the extending direction of arms 51, 52 when arms 51, 52 while maintaining mutually parallel relationship as the parallel link mechanism rotate around axles 53, 54.

With the rotation of arms 51, 52 around axles 53, 54, bulging portions 55, 56 also rotate around axles 53, 54. In arm mounting unit 42, levee-shaped cover portions 57, 58 are provided on the both sides of the groove-shaped opening along the edges of the opening so as to cover the locus of rotational movement of bulging portions 55, 56. Cover portions 57, 58 have a semicircular shape upright on the surface of arm mounting unit 42. In the present embodiment, by respectively providing bulging portions 53, 54 on arms 23, 24 and further providing cover portions 57, 58 on both sides of the groove-shaped opening, it is possible to prevent the user's finger from being accidentally pinched in the groove-shaped opening.

Further, it must be avoided that arms 51, 52 are moved due to weight of holding unit 60 and water dispensing gun 80 placed on holding unit 60 and that holding unit 60 also moves downward. Therefore, it is possible to configure that arms 51, 52 are sandwiched by metal plates at the positions of axles 53, 54 and wave washers or disc springs are applied to shaft-shape members constituting axles 53, 54 to press the metal plates in the direction of arms 51, 52 so that arms 51, 52 slide on the metal plates. In this configuration, since frictional resistance when arms 51, 52 sliding on the metal plates is increased, it is possible that arms 51, 52 hold the weight of holding unit 60 and water dispensing gun 80 via the sliding portion without rotating around axles 53, 54.

Figure 4A:
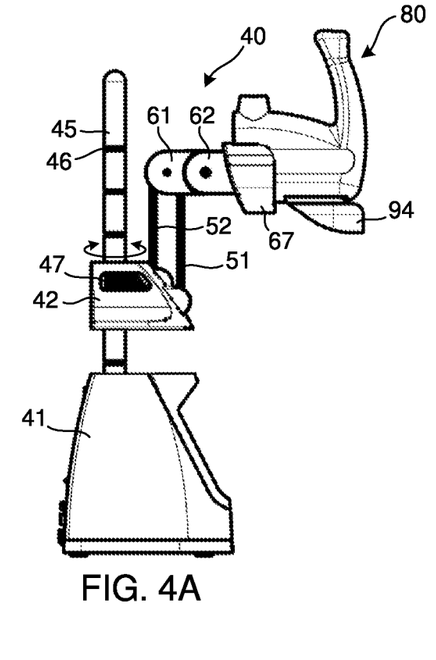
FIG. 4A, FIG. 4B and FIG. 4C are schematic side views illustrating exemplary uses of the water dispenser.
Figure 4B:
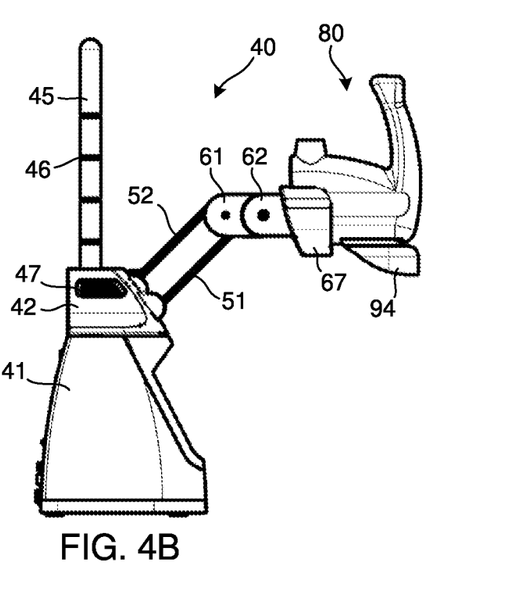
Figure 4C:
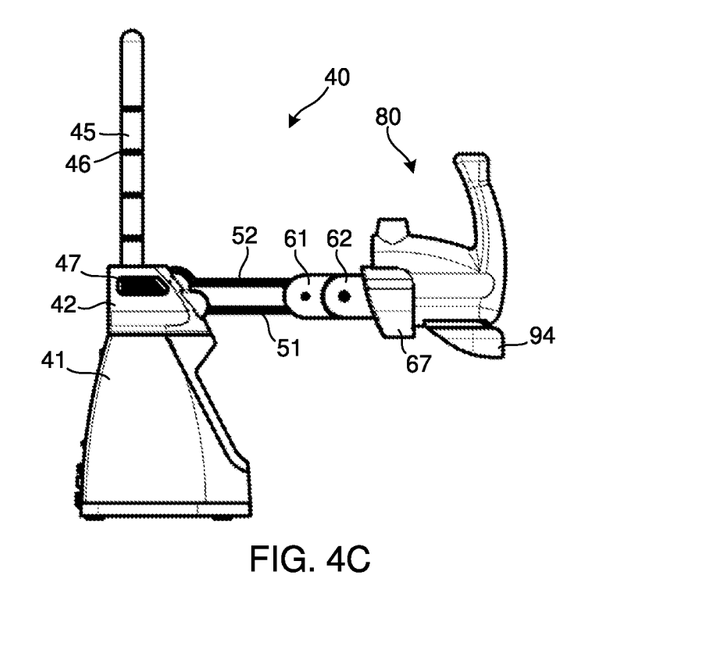

As described above, in water dispenser 30 of the present embodiment, as well as to be able to change the height position of arm mounting unit 42, it is possible to adjust the height of water dispensing gun 80 and to move water dispensing gun 80 to a position pulled out to the front side as viewed from main unit 40, by the use of arms 51, 52 with a parallel link mechanism. FIG. 4A, FIG. 4B and FIG. 4C are left side views showing such movement of arms 51, 52 and water dispensing gun 80, and illustrates water dispenser 30 in a simplified manner Composite pipe 70 is omitted in these drawings. FIG. 4A shows a state in which the position of arm mounting unit 42 is moved upward from the state shown in FIGS. 2A, 2B, 3A, 3B and 3C. FIG. 4B shows a state in which arms 51, 52 are in an oblique direction as a result of pulling out water dispensing gun 80, which is held in holding unit 60 to the front, from the state shown in FIGS. 2A, 2B, 3A, 3B and 3C. FIG. 4C shows a state in which arms 51, 52 are substantially leveled, as a result of pulling out water dispensing gun 80 further toward the front from the state shown in FIG. 4B. Further, as shown by an arrow in FIG. 4A, arm mounting unit 42 is rotatable around columnar portion 45.

Next, holding unit 60 will be described. As described above, holding unit 60 is attached to arm mounting unit 42 by means of arms 51, 52 with a parallel link mechanism, and has a function of holding water dispensing gun 80 in a constant posture regardless of the angle of arms 51, 52 with respect to the horizontal surface. Nozzle 86 of water dispensing gun 80 discharges pure water in a vertically downward direction during normal water dispensation. However, regardless of whether in the form of a water flow or in the form of a dropping, there is a case where it is desired to prevent splashing and bubbling of water due to discharge of pure water from nozzle 86. For example, when pure water is supplied from a water dispenser to a container such as a beaker, it may be required to suppress the occurrence of water splashing and bubbling in the container. In such cases, it is desirable to willfully discharge pure water along the inner wall of the container. In the present embodiment, in order to meet such a desire, a mechanism for adjusting the angle is incorporated into holding unit 60, so that water dispensing gun 80 in a state of being attached to holding unit 60 can be tilted. By tilting water dispensing gun 80, the discharge direction of pure water from nozzle 86 also inclines from the vertical downward.

Figure 5:
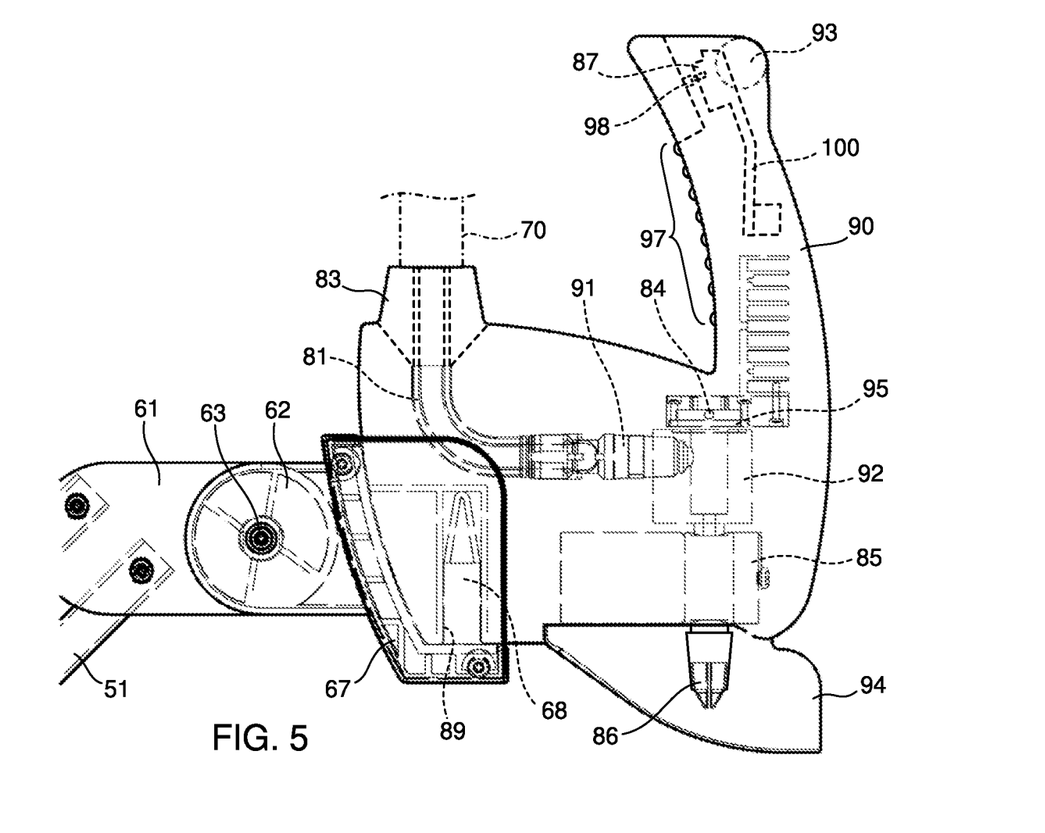
FIG. 5 is a side view showing the configuration of the holder portion and the water dispensing gun.

Holding unit 60 is generally composed of: first member 61 to which arms 51, 52 are attached: second member 62 connected to first member 61 via axle 63; and holder portion 67 provided at the tip end of second member 62. Holder portion 67 is a portion which actually holds water dispensing gun 80 in a detachable manner, and has a shape capable of wrapping a portion of an outer surface of water dispensing gun 80. As shown in FIG. 5 described later, pin 68 extending vertically upward is provided in holder portion 67, pin 68 is configured to be engaged with fixing hole 89 provided in water dispensing gun 80. By placing water dispensing gun 80 from above toward holder portion 67 so that pin 68 is inserted into fixing hole 89, water dispensing gun 80 is fixed to holder portion 67. By providing pin 68 for engaging fixing hole 89, water dispensing head 80 does not fall off easily from holder portion 57 when holder portion 57 is caused to support water dispensing head 80. Further, arms 51, 52 are moved by moving water dispensing gun 80, and an operation described above becomes possible such that water dispensing gun 80 is pulled out to the front. When removing water dispensing gun 80 from holder portion 67, water dispensing gun 80 may be pulled upward so that pin 68 is withdrawn from fixing hole 89. Holder portion 67 may be configured as a member integral with second member 62.

First member 61 and second member 62 are usually fixed in holding unit 60, but are connected to each other so that an angle between them is adjustable around axle 63. Such a mechanism can be realized by a configuration in which, for example, first member 61 and second member 62 are in contact with each other via sliding surfaces and a pressing force by a spring or the like is applied to the sliding surfaces. Alternatively, as shown in FIG. 3C, the mechanism is realized by a configuration in which recesses 65 are provided in second member 63 at a plurality of locations where the distance from axle 63 is equal, i.e., a plurality of locations to be equal radii, and a ball plunger or press fit plunger 64 so as to engage with any of recesses 65 is provided in first member 61. In the example shown in FIG. 3C, two press fit plungers 64 are provided in first member 61 so as to be symmetrical with respect to axle 63, and correspondingly, second member 62 is provided with four recesses 65 per one of press fit plunger 64. Recesses 65 are provided at equal intervals with each interval of 15° when viewed from the position of axle 63.

Without applying a strong rotational force about axle 63 between first member 61 and second member 62, each press fit plunger 64 engages any of four recesses 65 so that the positional relationship between first member 61 and second member 62 is kept. In contrast, when applying a strong force in the rotational direction around axle 63, the rotational force exceeds the holding force due to pressing fit plunger 64 engaging with recess 65, and then first member 61 and second member 62 relatively rotate around axle 63. When ceasing the application of the force in the rotational direction, press fit plunger 64 is engaged with recess 65 corresponding to the relative position between first member 61 and second member 62 at that time, and the positional relationship between first member 61 and second member 62 becomes to be maintained at that position. In this configuration, since recesses 65 are provided with intervals each of 15° when viewed from axle 63, the inclination of water dispensing gun 80, more specifically the discharge direction of pure water from nozzle 86 can be adjusted in increments of 15° within an angular range of 45° including the vertical downward.

Next, composite pipe 70 will be described. In water dispenser 30, composite pipe 70 is provided between the back surface of base 41 of main unit 40 and connecting member 83 provided in water dispensing gun 80. Since water dispensing gun 80 is detachable as described above and the position itself of holding unit 60 can be changed by a height adjustment of arm mounting unit 42 and a pull-out operation for arms 51, 52 even when water dispensing gun 80 is mounted on holding unit 60, it is necessary that composite pipe 70 has flexibility. Composite pipe 70 is obtained by bundling pipe 31, 32 and the electrical wiring between main unit 40 and water dispensing gun 80. A corrugated or bellows-shaped sheath or cover 71 is provided on the surface of composite pipe 70 so that pipes 31, 32 and the electrical wiring, which have been bundled, do not loosen. Cover 71 is formed of, for example, synthetic resin.

Next, water dispensing gun 80 will be described with reference to FIGS. 2A, 2B, 3A, 3B, 3C and 5. FIG. 5 shows the internal structure of water dispensing gun 80. Handle 90 extending vertically upward is formed in water dispensing gun 80 so that the user can hold and easily move it by hand. When water dispensing gun 80 is moved upward by holding handle 90, pin 68 of holder portion 67 is detached from fixing hole 89 of water dispensing gun 80. Thus, the user can perform water dispensation while keeping water dispensing gun 80 held in holding unit 60, or pour pure water one after another to a large number of test tubes placed in alignment on a laboratory bench by holding water dispensation gun 80 by hand. In order to improve workability when water dispensation gun 80 is held by hand, handle 90 itself is curved to match the shape of the human hand grip so that handle 90 can be reliably grasped. Further, on the surface of handle 90 facing the direction opposite to the user when the user holds handle 90 in one hand, i.e., the surface of the portion in contact with each finger rather than the palm of the hand when the user grips handle 90, a plurality of linear projections extending in the horizontal direction are formed as anti-slip 97. The surface on which anti-slip 97 is formed is a curved inwardly facing surface as handle 90 is curved. By providing wheel 93 at the position of the upper end of handle 90 which extends perpendicularly and arranging nozzle 86 at the lower end of handle 90 as described, water dispensing gun 80 provides the user with a feeling of operation similar to that of an experimental apparatus such as a digital pipette or an electronic pipette.

Wheel 93 described using FIG. 1 is provided at the position of the upper end of handle 90 so that a user who grasps handle 90 can operate with his or her thumb. Wheel 93 is of a cylindrical shape having a lower height than the radius, the rotation axis thereof is provided so as to be in a direction perpendicular to the longitudinal direction of wheel 93. In wheel 93, a portion less than half of the entire circumference of its cylindrical surface, for example, a portion of about ⅓ to ¼ of the entire circumference is exposed from the outer surface of handle 90. The cylindrical surface of wheel 93 is constituted by, for example, rubber or the like with a large number of parallel grooves formed thereon, so as not to slip when operated by a finger. By arranging wheel 93 in this manner, the user can rotate wheel 93 upward and downward, or even push wheel 93 in the direction of the interior of handle 90, by using his or her thumb. Direction of pushing when pushing wheel 93 into the interior of handle 90 is a direction perpendicular to the direction of the rotation axis of the wheel. That is, it can be said that wheel 93 is similar to a scroll wheel which is typically provided in a recent mouse used as a user interface in a personal computer or the like. However, with regard to the scroll wheel of the mouse, operation with a user's index finger or middle finger is generally assumed, wheel 93 of the present embodiment is different in that the operation with the thumb is assumed. Here, "upward" and "downward" indicate whether the portion of the front side for the user of the cylindrical surface of wheel 93 is moved upward or downward. The matter that wheel 93 has rotated is detected by rotary encoder 88 connected to the rotation axis of wheel 93, and processing circuit 89 notifies controller 25 of the rotation direction and the amount of rotation of wheel 93 based on a signal from rotary encoder 88.

In the present embodiment, the rotation direction of wheel 93 is used to adjust the flow rate of pure water when discharging pure water from nozzle 86. As an example, it is possible to increase the flow rate by turning wheel 93 upward, and to reduce the flow rate by turning downward. Alternatively, it is possible to reduce the flow rate by turning wheel 93 upward, and to increase the flow rate by turning downward. How much to increase or decrease the flow rate can be determined according to the amount of rotation of wheel 93. How to associate the rotational direction of wheel 93 with increase or decrease in the flow rate may be set in advance at the time of manufacture of the water dispenser, or may be changed after shipment by the setting in controller 25. In order to avoid malfunction or the like, in the same company or research institute, it is preferable to unify the relationship between the rotational direction of wheel 93 and increase or decrease in the flow rate.

Pushing wheel 93 in the direction of the interior of handle 90 is detected by microswitch 87, which is communicated to controller 25 via processing circuit 89. Microswitch 87 is used for the user entering a water-dispensation demand for dispensing water to cause controller 25 to control the opening and closing of solenoid valve 85. For example, it is possible to perform a control such as to discharge pure water from nozzle 86 by opening solenoid valve 85 only when wheel 93 is pushed. If the adjustment of the discharge amount of pure water in accordance with the rotation of wheel 93 as described above is performed, the flow rate of pure water discharged from nozzle 86 when wheel 93 is pushed is adjusted by rotation of wheel 93. Details of the control of solenoid valve 85 by controller 25 will be described later.

In this way, the water dispenser according to the present embodiment is configured such that, as the discharge direction of pure water from the nozzle 86 is vertically downward, water dispensing gun 80 is provided with handle 90 extending vertically upward, and wheel 93 which is rotatable and pushable into the interior of handle 90 is provided at the upper end of handle 90. The water dispenser is further configured to be able to control the discharging of pure water and the flow rate upon the discharging by the pushing operation and the rotation operation with respect to wheel 93. As a result, in this water dispenser, it becomes possible to easily perform an operation for controlling the flow rate of pure water even when a water dispensation operation is now performed. In contrast, in the water dispenser described in Patent Literature 2, it is difficult to achieve both the operation of pushing the knob of the dial type and the operation of turning the knob clockwise or counterclockwise at the same time, it is impossible to easily perform the operation for control of the flow rate of pure water discharged from nozzle 86.

Figure 6A:
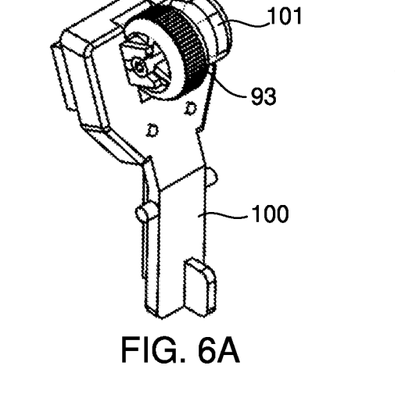
FIG. 6A and FIG. 6B are perspective views of the support member viewed from the front side and rear, respectively, in order to show the configuration of the support member.
Figure 6B:
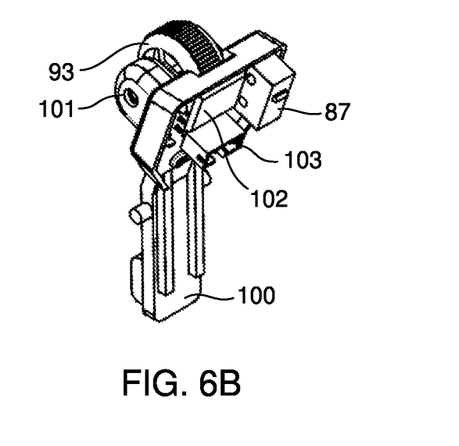

FIG. 6A and FIG. 6B are views illustrating support member 100 used to mount wheel 93 or the like in the interior of water dispensing gun 80. Particularly, FIG. 6A is a perspective view as viewed from the side of a surface on which wheel 93 is mounted, and FIG. 6B is a perspective view as viewed from a surface opposite to the surface of FIG. 6A. Support member 100 is a spatula-shaped member with a narrower width at its lower end side and a wider width at its upper end side. At the position of the upper end side of support member 100, wheel 93 is rotatably mounted on the side of one surface of support member 100. The rotation axis of wheel 93 is in a direction perpendicular to the longitudinal direction of support member 100. Not to prevent the rotation of wheel 93, the one surface of support member 100 at a position corresponding to wheel 93 is recessed, but not communicated with the other surface. Case 101 is provided on the side of one end of the rotation axis of wheel 93, and rotary encoder 88 is housed in this case 101. In support member 100, provided, in addition to microswitch 87, on the other surface or surface opposite to the surface on which wheel 93 is attached are: substrate 102 on which processing circuit 89 is mounted; and connector 103 to which the wiring for connecting processing circuit 89 to controller 100 is connected.

A groove-shaped opening is formed on the outer surface of the tip end portion of handle 90, and support member 100 is provided inside handle 90 so that a portion of wheel 93 is exposed from this opening to the outside of handle 90. Support member 100 is configured to move with a pivot point which is the lower end of support member 100 when wheel 93 is pushed. As a result, when wheel 93 is pushed in the direction of the interior of handle 90, the movable portion of microswitch 87 is contacted with contact member 98 provided inside handle 90, and then is displaced thereby microswitch 87 will be able to detect that wheel 93 is pushed.

Due to the property that water dispenser 30 is used for water dispensation of pure water in a laboratory, there is a possibility that wheel 93 of water dispensing gun 80 is operated by wet hands, and there is a possibility that water enters the inside of handle 90 from the opening for wheel 93. As water enters, electronic circuitry and electrical contacts around wheel 93 are susceptible to that effect. In the present embodiment, since the wheel is provided on the one surface of support member 100 and microswitch 87 and substrate 102 are provided on the other surface, it is possible to prevent the entry of water or the like to the contact portion of microswitch 87 and processing circuit 89 mounted on substrate 102. Rotary encoder 88 is also housed in case 101 and is less susceptible to water and the like.

As shown in FIG. 5, in water dispensing gun 80, nozzle 86 is provided on a surface to be the lower when placing water dispensing gun 80 on holder portion 67. Nozzle 86 is made of a fluoropolymer such as PTFE (polytetrafluoroethylene) or PVDF (polyvinylidene fluoride). A linear through hole is formed as a flow channel inside nozzle 86. Nozzle 86 discharges pure water from an opening which is a distal end of the through hole. When it is expected that the frequency of replacement of nozzle 86 is high, from the viewpoint of cost or the like, nozzle 86 may be formed by, for example, a resin such as polyethylene (PE) or polypropylene (PP). Cover 94 protects nozzle 86, and is provided in a shape that surrounds the periphery of nozzle 86 and opens downward so that dust or the like from the atmosphere does not enter the pure water discharged from nozzle 86. Cover 94 is formed of, for example, a transparent synthetic resin.

Pipes 81, 82 extending from connecting member 83 in the interior of water dispensing gun 80 are respectively connected to two ends of three-way joint 91. Another end or outlet of three-way joint 91 communicates with the interior of a hollow body or case 92 made of a fluoropolymer such as PTFE or PVDF. Here is used a Y-shaped joint as the three-way joint 91, a T-shaped joint may be used instead of the Y-shaped joint. Three way joint 91 constitutes a connection point between pipes 81, 82, thereby completing a path for circulating pure water for circulation purification between pure water producing apparatus 10 and water dispenser 30. Solenoid valve 85 is made of a fluoropolymer such as PTFE or PVDF at least a portion in contact with pure water, and is a valve in which a linear flow channel is formed from an inlet side toward an outlet side in its open state. The flow channel of pure water from the outlet of three-way joint 91 to the opening at the tip of nozzle 86 is constituted by case 92, solenoid valve 85 and nozzle 86. Especially in this water dispensing gun 80, the flow channel by case 92, solenoid valve 85 and nozzle 86 is arranged on a straight line. That is, the flow channel through which pure water supplied to nozzle 86 flows is formed in a straight line in a section including the opening at the tip end of nozzle 86 as one end of the section.

Ultraviolet LED 84 is arranged so as to irradiate, from the side of case 92 toward nozzle 86 along the axial direction of the flow channel, pure water in this flow channel with ultraviolet rays from the upstream side of the flow of pure water. In order to be able to introduce ultraviolet rays into case 92, a surface of case 92 facing ultraviolet LED 84 is constituted by quartz glass plate 95 serving as an ultraviolet introduction window. Ultraviolet rays are emitted with a certain broadening from ultraviolet LED 84 in practice. Since the optical axis of the emitted light of ultraviolet LED 84 coincides with the axis of the flow channel, ultraviolet rays from ultraviolet LED 84 reach nozzle 86, particularly when solenoid valve 85 is in the open state. As a result, pure water flowing in the flow channel leading to nozzle 86 for discharge can be irradiated with ultraviolet rays, and sterilization treatment of pure water can be performed at a timing immediately before discharge from nozzle 86. Except for the portion of quartz glass plate 95 which is an ultraviolet introducing window, the inner wall of the flow channel through case 92 and solenoid valve 85 to nozzle 86 is made of a fluoropolymer. The fluoropolymer is preferable as a material constituting a portion to be irradiated with ultraviolet rays because it has little elution against pure water, and has durability against ultraviolet rays, and further largely irregularly reflects ultraviolet rays, that is, diffuse-reflects ultraviolet rays.

Next, a device which can be used as ultraviolet LED 84 will be described. In this embodiment, since viable bacteria in pure water are reduced by ultraviolet rays generated by ultraviolet LED 84, ultraviolet rays generated by ultraviolet LED 84 need to have a wavelength having a highly bactericidal effect. From this viewpoint, it is preferable to use ultraviolet LED 84 having an emission peak wavelength within a range of 260 nm or more and 285 nm or less. Since ultraviolet LED 84 of this degree of wavelength has a large heating value during operation, it is preferable to attach an appropriate heat radiating plate or heat sink to ultraviolet LED 84.

Conventionally, mercury lamps have been widely used as a light source for ultraviolet rays for sterilizing, but mercury lamps are large in size and cannot be incorporated into water dispensers and the like. In addition, the mercury lamp is not suitable for use in which it is operated every time there is a demand for pure water at the point of use because it takes a long time to rise and the life is remarkably shortened when the frequency of on/off is high. On the other hand, in the present embodiment, by using an ultraviolet LED which is small in size and has a fast rise time and is less deteriorated even if the on/off is repeated, it is incorporated into a water dispenser to enable a sterilization process at a timing immediately before discharge from nozzle 86. For example, the size of the ultraviolet LED is on the extent of several mm square to 2 cm square, and the rise time of the ultraviolet LED is also on the order of milliseconds, which is comparable to or faster than the operating time of solenoid valve 85. When an ultraviolet LED is used, even if irradiation with ultraviolet rays is performed only when there is a demand for pure water, a sterilization treatment can be reliably performed without causing a trouble in the life of the device.

Next, a configuration for controlling water dispenser 30 of the present embodiment will be described with reference to FIG. 1. Controller 25 provided in pure water producing device 10 performs control of the entire pure water producing device 10 including water dispenser 30, but in particular, controls discharge of pure water in water dispenser 30 and also controls irradiation of ultraviolet rays to pure water to be discharged. The dotted lines in FIG. 1, of the wiring of the electrical system to controller 25, show the wiring related to the control of the discharge of pure water from water dispenser 30. Controller 25 receives the flow rate detection result from flow sensor 13 in pure water producing apparatus 10, and controls the opening and closing of solenoid valve 23. Further, controller 25 receives a signal from processing circuit 89 provided in water dispensing gun 80, drives ultraviolet LED 84, and controls opening and closing and the opening degree of solenoid valve 85. Further, operation panel 43 of water dispenser 30 is also connected to controller 25, and controller 25 displays information to the user via operation panel 43, prompts the user to enter the setting, and accepts an input of the setting from the user.

As described above, by pushing wheel 83 provided on water dispensing gun 80 to actuate micro switch 87, the user can enter the water-dispensation demand for dispensing water. However, the means for entering the water-dispensation demand is not limited to microswitch 87 that mechanically connects to wheel 93. For example, while enabling the input of the water-dispensation demand by microswitch 87, a foot switch (not shown) operable by the user's foot may be provided and water-dispensation demand may be input to controller 25 by the operation against the foot switch.

Items that can be set by the user through operation panel 43 include: for example, an amount of water to be dispensed and water-dispensation mode. The water-dispensation mode includes, for example, a volumetric mode and an arbitrary amount mode. The volumetric mode is a mode in which a predetermined amount of pure water is dispensed by a single switch operation (i.e., a single water-dispensation demand) In contrast, the arbitrary amount mode is a mode in which the pure water is continuously discharged from nozzle 86 during a period in which a switch such as microswitch 87 is operated, that is, during a period in which the water-dispensation demand is issued. When receiving a water-dispensation demand by a switch operation or the like when the volumetric mode is set, controller 25 performs control to close solenoid valve 23, and then to open solenoid valve 85 until the accumulated value of the flow rate detected by flow sensor 13 reaches the set value. When the accumulated value of the flow rate reaches the set value, controller 25 resumes circulation of pure water by opening solenoid valve 23 and close solenoid valve 85 in water dispensing gun 80 to terminate the water dispensation. This means that a predetermined amount of pure water could be dispensed. On the other hand, when the water-dispensation mode is the arbitrary amount mode and controller 25 accepts the water-dispensation demand by operation such as microswitch 87 being operated via wheel 93, controller 25 performs control to open solenoid valve 85 only for a period in which the water-dispensation demand is issued. As a result, during the period of switch operation by the user, pure water is discharged from nozzle 86 through solenoid valve 85. In the case of the arbitrary amount mode, solenoid valve 23 remains in the open state, and circulation of pure water between pure water producing apparatus 10 and water dispenser 30 continues.

In the present embodiment, as solenoid valve 85 provided inside water dispensing gun 80, a valve whose open degree can be controlled is used. Controller 25 can control the flow rate of pure water discharged from nozzle 86 by adjusting the opening degree of solenoid valve 85 when opening solenoid valve 85. The flow rate of pure water discharged, as described above, can also be adjusted by rotating wheel 93 in the upward direction or the downward direction, or can be performed by an input operation on the screen of operation panel 43. Since the matter that the user has rotated wheel 93 is detected by rotary encoder 88 and its rotational direction and rotation amount is transmitted from processing circuit 89 to controller 25, controller 25 adjusts the opening degree of solenoid valve 85 in accordance with the notified rotational direction and the notified amount of rotation. The adjusted opening degree is then maintained until wheel 93 is next operated, and, if the switch operation is performed therebetween, solenoid valve 85 is controlled to open with the adjusted opening degree. Of course, if the switch operation is not performed, regardless of the adjusted opening degree, solenoid valve 85 is controlled to be closed. Alternatively, a predetermined value (default value) for the opening degree of solenoid valve 85 may be defined in advance, and, when the user rotates wheel 93 while performing a switch operation pushing the wheel 93, the discharge amount of pure water may be increased or decreased by changing the opening degree in accordance with the rotation. In this case, when the user stops pushing wheel 93, solenoid valve 85 is closed and the opening degree used when opening solenoid valve 85 next time is returned to the predetermined value. As a result, at the next time when wheel 93 is pushed actually to perform the switch operation, solenoid valve 85 will open at the predetermined opening degree.

Although it is assumed here that the opening degree of solenoid valve 85 is adjusted, a flow control valve, for example, as a flow rate adjusting mechanism controlled by controller 25 may be provided in pipe 31 in main unit 40 of water dispenser 30 and the adjustment of the flow rate may be performed in the flow rate adjusting mechanism within main unit 40 while solenoid valve 85 of water dispensing gun 80 simply performs opening and closing. Further, a flow control valve may be provided inside pure water producing apparatus 10.

In addition to the control of solenoid valves 23, 85 described here, controller 25 performs control in which ultraviolet LED 84 is driven regardless of the water-dispensation mode when solenoid valve 85 in water dispensing gun 80 is open while ultraviolet LED 84 is turned off when solenoid valve 85 is closed. This control is actually realized by performing the driving of ultraviolet LED 84 in conjunction with the opening and closing of solenoid valve 85. Thus, pure water discharged from nozzle 86 is irradiated with ultraviolet rays at a timing immediately before discharge from nozzle 86, and is subjected to sterilization treatment.

If sterilization treatment by ultraviolet irradiation is carried out somewhere in the pathway of circulation while pure water is circulated, viable bacteria are hardly propagated. On the other hand, in pure water in a place where the pure water stays without circulation, viable bacteria tend to propagate. Case 92 and solenoid valve 85 in water dispensing gun 80 of water dispenser 30 may also satisfy the condition that the viable bacteria tend to propagate if water dispensation is not performed over a long period of time. Therefore, in this embodiment, even when water dispensation is not performed, it is preferable to drive ultraviolet LED 84 for about 1 minutes, for example, 1 times per 1 hours, and to perform the sterilization treatment on pure water staying in case 92 or solenoid valve 85.

Although, in water dispenser 30 described above, solenoid valve 85 is arranged between case 92 into which ultraviolet rays from the ultraviolet LED 84 is incident and nozzle 86 for discharging pure water, the place of providing solenoid valve 85 is not limited thereto. For example, solenoid valve 85 may be placed between three-way joint 91 and case 92 thereby directly connecting nozzle 86 to case 92. That is, regardless of the position of solenoid valve 85, water dispensing gun 80 may be configured to be capable of irradiating pure water flowing out of solenoid valve 85 with ultraviolet rays. Further, a single pipe branched from the circulation purification system in pure water producing apparatus 10 may be connected to water dispenser 30 without extending the pipes constituting the circulation purification system of pure water producing apparatus 10 to water dispenser 30. In addition, a tank for storing pure water may be used as a pure water source, and pure water from this tank may be supplied with water dispenser 30. However, since viable bacteria tend to propagate at a place where pure water tends to stay as described above, it is preferable that the whole of these places where pure water tends to stay can be irradiated with ultraviolet rays so that sterilization treatment can be performed, as long as possible. Therefore, it is preferable to provide solenoid valve 85 between case 92 and nozzle 86 so that solenoid valve 85 is also irradiated with ultraviolet rays. It is preferable to use a circulation purification system capable of performing sterilization during circulation as a pure water source. When pure water producing apparatus 10 configured as a pure water purification system is used as a pure water source, it is preferable to draw the pipes constituting the circulation purification system to water dispensing gun 80 in order to shorten the pipe length of the portion branched from the circulation purification system as much as possible.

The water dispenser described above can easily perform stable water dispensation for various containers having different sizes and heights and, can suppress water splashing and bubbling of water at the time of water dispensation. Further, in the water dispenser, operation for controlling the flow rate of pure water can be easily performed even when water dispensation operation is performed. However, in some cases, it is not necessary to respond to various containers having different sizes and heights, and for such cases, it is also possible to constitute a water dispenser which is intended only to suppress water splashing and bubbling during water dispensation. Such a water dispenser will be referred to as a splash-preventing water dispenser. Similarly, in some cases, it is not necessary to respond to various containers having different sizes and heights, and it is also possible to constitute a water dispenser which is intended only to easily perform an operation for controlling the flow rate of pure water when water dispensation operation is performed, and this is referred to as an easy-operation water dispenser. The following describes the splash-preventing water dispenser and the easy-operation water dispenser.

A splash-preventing water dispenser is a water dispenser which is connected to a pure water source and used for dispensing pure water, and includes: water dispensing gun (80) equipped with nozzle (86) for discharging pure water; holding unit (60) for holding water dispensing gun (80); a mounting base; and a connecting mechanism for connecting holding unit (60) to the mounting base so that the relative position of holding unit (60) with respect to the mounting base can be changed without changing the posture of water dispensing gun (80) with respect to the mounting base. In this splash-preventing water dispenser, holding unit (60) includes: first member (61) to which the connecting mechanism is attached; and second member (62) connected to first member (61), wherein water dispensing gun (80) is held by holding unit (60) on the side of second member (62), and the angle between first member (61) and second member (62) is adjustable about axle (63) provided at a position where first member (61) and second member (62) are connected to each other. In this water dispenser, axle (63) may be configured to extend horizontally, for example, and in this case, the angle may be adjusted around axle (63) so that the direction of the nozzle varies within an angle range including, for example, a vertical lower direction.

In the splash-preventing water dispenser, a plurality of recesses (65) provided equidistant from axle (63) may be formed on one of first member (61) and second member (62), and press fit plunger (64) capable of being engaged with any of recesses (65) may be provided on the other of first member (61) and second member (62). Also in the water splash-preventing water dispenser, water dispensing gun (80) may be detachably held by holding unit (60). In this case, holder portion (67) which is fixed to second member (62) and has pin (68) extending upward and engageable with fixing hole (89) provided in water dispensing gun (80) may be provided in holding unit (60), and water dispensing gun (80) may be placed on holder portion (67) in a manner that pin (68) is inserted into fixing hole (89), so that water dispensing gun (80) may be fixed to holding unit (60) so that the discharge direction of pure water from nozzle (86) is vertically downward.

An easy-operation water dispenser is a water dispenser which is connected to a pure water source and used for dispensing pure water, and includes: water dispensing gun (80) equipped with nozzle (86) for discharging pure water; and valve (85) provided in a flow channel of pure water to nozzle (86), wherein water dispensing gun (80) is provided with handle (90) extending vertically upward when the discharge direction of pure water from nozzle (86) is assumed to be vertically downward. In this easy-operation water dispenser, wheel (93) which is rotatable and pushable into the interior of handle (90) is provided at the upper end of handle (90), valve (85) is opened when wheel (93) is pushed, and the flow rate of pure water discharged from nozzle (86) when valve (85) opens is adjusted in accordance with the rotation direction and the amount of rotation of wheel (93). The water dispenser may be configured so that wheel (93) partially protrudes from the outer surface of the handle (90), for example, and the rotation axis of wheel (93) is perpendicular to the longitudinal direction of handle (90) and perpendicular to the direction of pushing of wheel (93) into the interior of handle (90). Handle (90) may be curved, and in this case, a plurality of linear projections perpendicular to the direction in which handle (90) extends may be formed as anti-slip on the surface of handle (90) facing inwardly of the curvature.

In the easy-operation water dispenser, valve (85) may be, for example, solenoid valve (85) provided inside water dispensing gun (80). When solenoid valve (85) is used, the water dispenser may further include: rotary encoder (88) for detecting rotation of wheel (93); microswitch (87) for detecting pushing of the wheel; and processing circuit (89) for processing the signal from rotary encoder (88) and the signal from microswitch (87), and may be configured to open and close solenoid valve (85) and to adjust the flow rate in response to the signal from processing circuit (89). In this water dispenser, wheel (93), rotary encoder (88), micro switch (87) and processing circuit (89) may be mounted on support member (100) provided inside handle (90), and, in this case, wheel (93) may be attached to the first surface of support member (100), and microswitch (87) and processing circuit (89) may be attached to second surface which is opposite to the first surface. The easy-operation water dispenser may be configured such that, for example, adjustment of the flow rate may be performed by, for example, adjusting the opening degree of solenoid valve (85).

REFERENCE SIGNS LIST

10 Pure water producing apparatus;
23, 85 Solenoid valves;
25 Controller;
30 Water dispenser;
40 Main unit;
41 Base;
42 Arm mounting unit;
45 Columnar portion;
51, 52 Arms;
53, 54, 63 Axles;
55, 56 Bulging portions;
60 Holding unit;
61 First member;
62 Second member;
67 Holder portion;
80 Water dispensing gun;
85 Solenoid valve;
90 Handle;
86 Nozzle;
93 Wheel.

The invention claimed is:

1. A water dispenser for use in dispensing pure water, connected to a pure water source, the water dispenser comprising:
an arm mounting unit;
a water dispensing gun including a nozzle for discharging pure water;
a holding unit for holding the water dispensing gun; and
at least two arms connecting the holding unit to the arm mounting unit,
wherein the at least two arms constitute, as a connecting mechanism, a parallel link mechanism in which a trajectory of each arm when the at least two arms move is within a same vertical plane.

2. The water dispenser according to claim 1,
wherein the arm mounting unit includes:
two axles provided in an interior of the arm mounting unit for rotatably holding one ends of the at least two arms respectively; and
a groove-shaped opening formed on an outer surface of the arm mounting unit in accordance with a movable range of the at least two arms,
wherein each of the at least two arms includes a bulging portion provided in vicinity of the one end, and
wherein the bulging portion of each of the at least two arms cooperates to close the opening regardless of orientation of the at least two arms in the vertical plane.

3. The water dispenser according to claim 2,
wherein the holding unit includes: a first member to which the connecting mechanism is attached; and a second member connected to the first member,
wherein the water dispensing gun is held by the holding unit on a side of the second member, and
wherein an angle formed by the first member and the second member about an axle provided at a connection position between the first member and the second member is adjustable.

4. The water dispenser according to claim 3,
wherein a plurality of recesses provided at positions equidistant from the axle are formed on one of the first member and the second member, and
wherein a press fit plunger is provided on the other of the first member and the second member so as to be engageable with any of the recesses.

5. The water dispenser according to claim 4,
wherein the water dispenser includes: a base to be placed on an installation surface; the arm mounting unit; and a columnar portion extending vertically upward from the base, and
wherein the arm mounting unit is penetrated by the columnar portion and attached movably in a vertical direction to the columnar portion.

6. The water dispenser according to claim 1,
wherein the water dispenser includes: a base to be placed on an installation surface; the arm mounting unit; and a columnar portion extending vertically upward from the base, and
wherein the arm mounting unit is penetrated by the columnar portion and attached movably in a vertical direction to the columnar portion.

7. The water dispenser according to claim 6, wherein an engaging portion is formed on a surface of the columnar portion, and, by engaging the arm mounting unit with the engaging portion, it is possible to fix height of the arm mounting unit.

8. The water dispenser according to claim 6, wherein the arm mounting portion is rotatable about the columnar portion.

9. The water dispenser according to claim 1, wherein the water dispensing gun is detachably held on to the holding unit.

10. The water dispenser according to claim 9,
wherein the holding unit includes a pin engageable with a fixing hole provided in the water dispensing gun, the pin extending upward, and
wherein, by placing the water dispensing gun on the holding unit so as to insert the pin into the fixing hole, the water dispensing gun is fixed to the holding unit so that a discharge direction of pure water from the nozzle is vertically downward.

11. The water dispenser according to claim 1,
wherein the holding unit includes: a first member to which the connecting mechanism is attached; and a second member connected to the first member,
wherein the water dispensing gun is held by the holding unit on a side of the second member, and
wherein an angle formed by the first member and the second member about an axle provided at a connection position between the first member and the second member is adjustable.

12. The water dispenser according to claim 11,
wherein a plurality of recesses provided at positions equidistant from the axle are formed on one of the first member and the second member, and
wherein a press fit plunger is provided on the other of the first member and the second member so as to be engageable with any of the recesses.

13. The water dispenser according to claim 1, further comprising a valve provided in a flow channel of pure water to the nozzle,
wherein the water dispensing gun includes a handle extending vertically upward when a discharge direction of pure water from the nozzle is vertically downward,
wherein a wheel which is rotatable and pushable into an interior of the handle is provided at an upper end of the handle, and
wherein the valve is opened when the wheel is pushed, and a flow rate of pure water discharged from the nozzle when the valve is opened is adjusted according to a rotation direction and a rotation amount of the wheel.

14. The water dispenser according to claim 13, wherein the wheel projects partially from an outer surface of the handle, an axis of rotation of the wheel being perpendicular to a longitudinal direction of the handle and perpendicular to a direction of pushing of the wheel into the interior of the handle.

15. The water dispenser according to claim 14, further comprising:
  a rotary encoder for detecting rotation of the wheel;
  a micro switch for detecting pushing of the wheel; and
  a processing circuit for processing signals from the rotary encoder and the microswitch,
  wherein opening and closing of the solenoid valve and adjustment of the flow rate are made in response to signals from the processing circuit.

16. The water dispenser according to claim 15, wherein a support member to which the wheel, the rotary encoder, the microswitch, and the processing circuit are mounted is provided within the handle, the wheel is mounted on a first surface of the support member, and the microswitch and the processing circuit are mounted on a second surface of the support member, the second surface being opposite to the first surface.

17. The water dispenser according to claim 15, wherein the adjustment of the flow rate is made by adjusting an opening degree of the solenoid valve.

18. The water dispenser according to claim 13, wherein the valve is a solenoid valve provided inside the water dispensing gun.

19. A pure water producing apparatus comprising a water dispenser according to claim 1, wherein the pure water producing apparatus supplies pure water to the water dispenser as the pure water source.

* * * * *

UNITED STATES PATENT AND TRADEMARK OFFICE
CERTIFICATE OF CORRECTION

PATENT NO. : 11,325,822 B2
APPLICATION NO. : 17/295233
DATED : May 10, 2022
INVENTOR(S) : T. Hoshino et al.

It is certified that error appears in the above-identified patent and that said Letters Patent is hereby corrected as shown below:

In the Claims
Column 17, Line 44 (Claim 2) change "one ends" to -- one of the ends --.
Column 19, Line 14 (Claim 15) change "micro switch" to -- microswitch --.

Signed and Sealed this
Eleventh Day of October, 2022

Katherine Kelly Vidal
*Director of the United States Patent and Trademark Office*